United States Patent [19]
Ueda et al.

[11] Patent Number: 4,869,670
[45] Date of Patent: Sep. 26, 1989

[54] WIRE HARNESS ARRANGEMENT FOR AUTOMOTIVE VEHICLE

[75] Inventors: Shinichi Ueda; Yoshiaki Nakayama, both of Shizuoka, Japan

[73] Assignee: Yazaki Corporation, Japan

[21] Appl. No.: 126,489

[22] Filed: Nov. 30, 1987

[30] Foreign Application Priority Data

Aug. 14, 1986 [JP] Japan ............................. 61-189632

[51] Int. Cl.$^4$ ........................................... H01R 23/66
[52] U.S. Cl. .................................... 439/34; 439/77; 439/492; 49/502; 174/72 A; 296/146
[58] Field of Search .................. 439/34, 492, 494, 495, 439/498, 499, 55, 77, 577, 894; 49/502; 174/72 A; 296/39 R, 146, 208

[56] References Cited

U.S. PATENT DOCUMENTS

| | | | |
|---|---|---|---|
| 3,042,137 | 7/1962 | Mathues et al. | 361/417 |
| 4,051,383 | 9/1977 | Dola | 439/492 |
| 4,065,199 | 12/1977 | Andre et al. | 439/498 |
| 4,122,357 | 10/1978 | Sumida | 174/72 A |
| 4,306,381 | 12/1981 | Presto | 49/502 |
| 4,711,052 | 12/1987 | Maeda et al. | 49/502 |

FOREIGN PATENT DOCUMENTS

| | | | |
|---|---|---|---|
| 0563359 | 9/1958 | Canada | 439/492 |
| 0142435 | 11/1984 | | |
| 0130844 | 1/1985 | European Pat. Off. | 439/34 |
| 97814 | 3/1981 | Japan | 296/146 |
| 114720 | 2/1984 | Japan | 296/146 |
| 0084621 | 5/1984 | Japan | 296/146 |
| 1193420 | 5/1969 | United Kingdom . | |
| 1413518 | 11/1972 | United Kingdom . | |
| 2014368 | 8/1979 | United Kingdom | 439/77 |
| 2164609 | 8/1985 | United Kingdom . | |
| 2166603 | 9/1985 | United Kingdom . | |

*Primary Examiner*—Gary F. Paumen
*Attorney, Agent, or Firm*—Wigman & Cohen

[57] ABSTRACT

Wire harnesses for connecting a number of electric devices mounted on an automotive vehicle are arranged on flat resin frame covers fixed to vehicle frames or directly on resin vehicle frames or most preferably on a resin vehicle body, in order to facilitate wiring of electric devices, reduce harness spaces without use of harness fixtures, and automatize wire harness manufacturing processes. The wire harness thus arranged is connected to electric devices by engaging each set of harness end terminals with each electric device connector attached to the vehicle frame.

7 Claims, 2 Drawing Sheets

WIRE HARNESS ARRANGEMENT FOR AUTOMOTIVE VEHICLE

BACKGROUND OF THE INVENTION

1. Field of the Invention

The present invention relates to a wire harness arrangement for an automotive vehicle, and more specifically to a wire harness for connecting various electric and electronic devices mounted on an automotive vehicle.

2. Description of the Prior Art

In connecting various electric or electronic devices mounted on an automotive vehicle, so far a set of cable harness composed of a trunk portion formed by taping a number of wire cables and a number of branch portions branched from the trunk portion has been used. The cable harness is arranged within spaces formed between the vehicle frames or the vehicle body and other vehicle parts, and fixed at appropriate positions with fixtures. Ends of the branch portions are each provided with cable harness connectors connectable to various electric devices mounted on an automotive vehicle.

Recently, however, since the number of electric devices mounted on an automotive vehicle has been increased markedly, the diameter of the cable harness becomes large and therefore it has become a serious problem in that there exists no sufficient space where the cable harness is to be arranged within the automotive vehicle.

In addition, since the length of branch portions and the position of branch end connectors are different and diversified, the cable harness productivity has been poor and therefore long time and much labor have been required to couple a number of harness connectors with a number of device connectors within small vehicle spaces as of the instrument panel or door frame.

SUMMARY OF THE INVENTION

With these problems in mind, therefore, it is the primary object of the present invention to provide a wire harness arrangement for an automotive vehicle which can eliminate cable harness arrangement processes, facilitate automatization of harness production, and reduce harness spaces within an automotive vehicle, markedly.

To achieve the above-mentioned object, a wire harness arrangement for an automotive vehicle including electric devices and a vehicle body, according to the present invention, comprises: (a) at least one vehicle frame for constituting the vehicle body; (b) at least one vehicle frame cover made of an insulating material, for covering an entire surface of said vehicle frame; and (c) a wire harness arranged on a surface of said vehicle frame cover, for connecting electric devices mounted on said vehicle frame.

When the vehicle frame (e.g. door frame) is formed integral with the vehicle frame cover (e.g. trim cover) and made of an insulating material, the wire harness is directly attached to the vehicle frame. Further, it is also preferable to directly arrange the wire harness on a vehicle body made of an insulating material.

Since the wire harness is provided with a plurality of sets of harness end terminals, each set of the harness end terminals can be connected to each electric device connector. Further, the wire harness comprises conductors of single wires, stranded wires, bus bars, ribbon or foil strips.

BRIEF DESCRIPTION OF THE DRAWINGS

The features and advantages of the wire harness arrangement for an automotive vehicle according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

With reference to the attached drawings, the wire harness arrangement for an automotive vehicle according to the present invention will be described with respect to its application to an automotive vehicle door.

Figure 1:
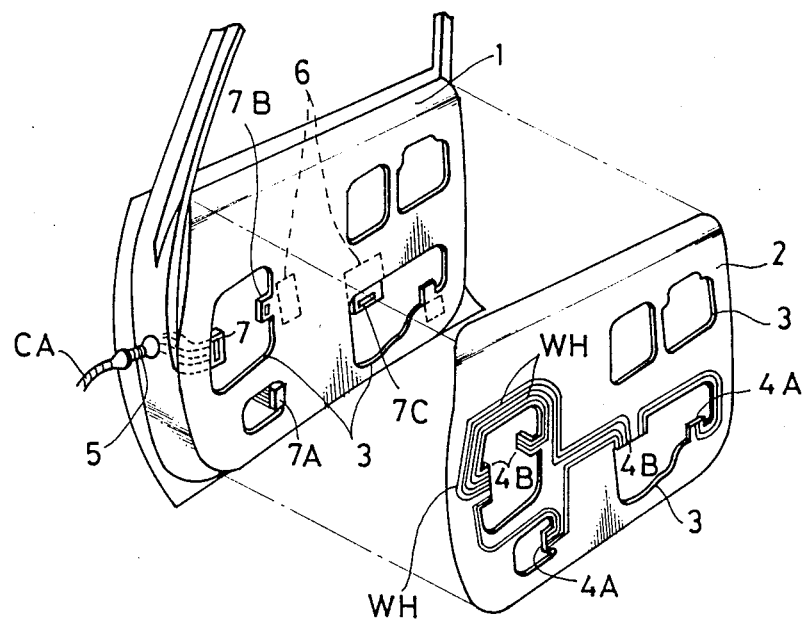
FIG. 1 is a perspective view showing a first embodiment of the wire harness arrangement of the present invention when applied to an automotive vehicle door.

In FIG. 1, a vehicle door is composed of a metallic door frame 1 and a resin trim cover 2 fixed to the door frame 1. These two parts are!formed with a plurality of access holes 3, respectively through which a plurality of electric devices 6 are mounted within the door frame 1.

A cowl side cable CA extending from a vehicle body (not shown) is supported by a waterproof grommet 5 at an front end of the door frame 1. The plural electric devices 6 such as a power window motor, an autodoor lock solenoid, etc. are housed within the door frame 1.

Further, a cable connector 7 connected to the cowl side cable CA, and other connectors 7A, 7B and 7C connected to each electric device 6 are fixed with screws at edges of the access windows 3, respectively.

On the other hand, a wire harness WH for connecting the cowl side cable CA to various electric devices 6 is disposed at the outer side of the resin trim cover 2. This wire harness WH is formed by arranging a number of flat straight conductors extending in the horizontal and vertical directions. Further, this wire harness WH is provided with a plurality of sets of protruding harness conductor terminals 4A and 4B, and these conductor terminals 4A and 4B are arranged at the edges of the access windows 3, respectively.

Figure 2:
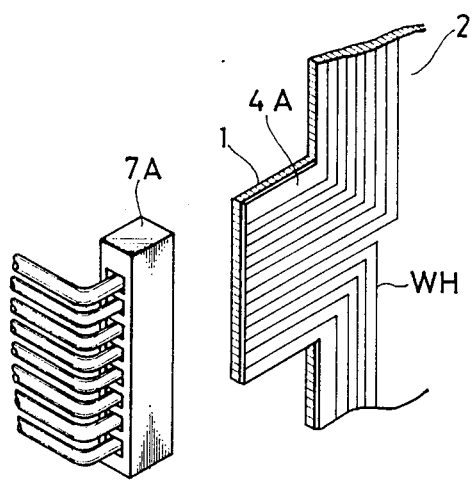
FIG. 2 is a perspective view showing a first example of harness end terminals connected to an electric device connector.

In more detail, the protruding terminals 4A extend in a direction parallel to the surface of the resin trim cover 2 as shown in FIG. 2 or perpendicular to the surface of the resin trim cover 2. The flat protruding terminals 4A parallel to the trim cover 2 are inserted into a device connector 7A bent along the surface of the wire harness 2, while the L-shaped protruding terminals 4B perpendicular to the trim cover 2 are inserted into a device connector 7B directed toward the trim cover 2, both as shown.

The wire harness WH is fixedly disposed on the resin trim cover 2 by various techniques. For example, the harness conductors are buried in the resin trim cover 2 by an ultrasonic welder; conductors are fixed by bonding in grooves formed on the resin trim cover 2; the resin trim cover is molded together with the conductors; the conductors are etched on the resin trim cover so as to form a pattern, etc. Further, as the harness conductors, it is possible to use single wires, stranded wires, bus bars, ribbon or foil strips used for a printed circuit board, etc.

The resin trim cover 2 is fixed to the door frame 1 by melding, bonding, screws, clamps, etc. Thereafter, the protruding harness terminals 4A and 4B are mated with the device connectors 7A and 7B. That is, it is possible to connect various electric devices 6 housed within the door frame simply by fixing the trim cover 2 to the door frame 1 and by engaging the harness terminals 4 with the device connectors 7. Therefore, after the resin trim cover 2 has been fixed to the door frame in the door frame subassembly processes, it is possible to eliminate troublesome steps of wiring electric devices in the vehicle assembly processes.

Figure 3:
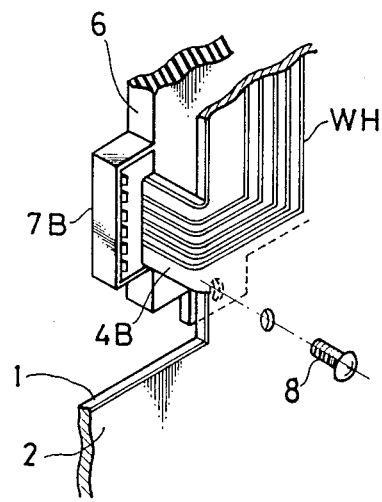
FIG. 3 is a perspective view showing a second example of harness end terminals connected to an electric device connector.

Further, it is also possible to assemble the electric devices 6 simultaneously when the trim cover 2 is fixed to the door frame. That is, since the wire harness WH is provided (fixed) on the resin trim cover 2, as shown in FIG. 3, the electric device 6 can be fixed to the trim cover 2 through the access window 3 by means of a screw 8.

Figure 4:
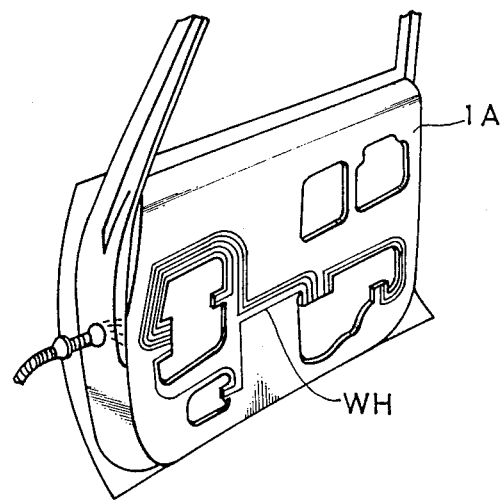
FIG. 4 is a perspective view showing a second embodiment of the wire harness arrangement of the present invention when applied to an automotive vehicle door.

FIG. 4 shows another embodiment of the present invention. In this embodiment, the door frame 1A and the trim cover and both made of resin integral with each other, so that the wire harness WH is directly arranged on the door frame. In this embodiment, it is possible to further streamline the door frame subassembly processes.

Figure 5:
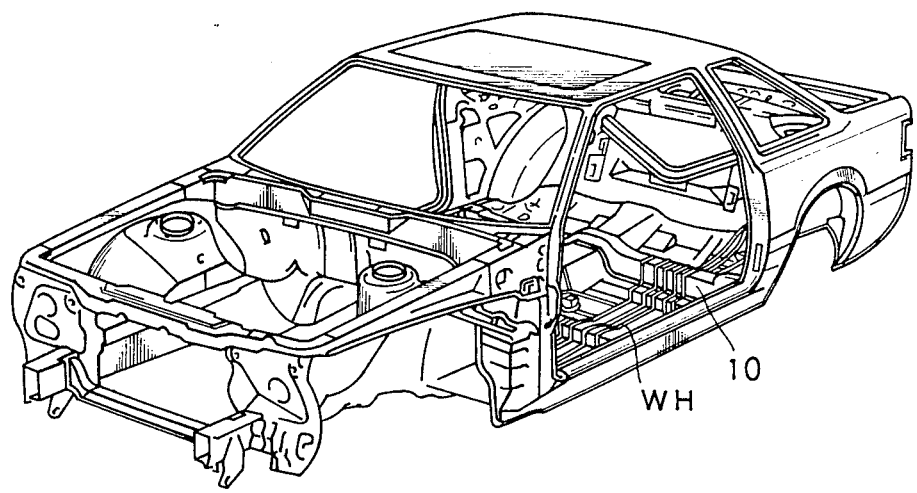
FIG. 5 is a perspective view showing a third embodiment of the wire harness arrangement of the present invention when applied to an automotive vehicle body.

FIG. 5 shows another embodiment of the present invention. In this embodiment, a vehicle body frame 10 itself is made of resin, so that the wire harness WH is directly buried in the body frame 10. In this embodiment, it is possible to further streamline the vehicle assembly processes.

In the above-description, the wire harness is fixed on a resin parts (e.g. resin trim cover). However, without being limited thereto, the wire harness can be arranged on any kind of insulating materials having an appropriate mechanical strength.

As described above, in the wire harness arrangement for an automotive vehicle according to the present invention, since the wire harnesses are arranged on resin plate-like parts fixed to vehicle frames or directly on the vehicle frames, there are many advantages as follows: connecting steps of electric devices via wire harnesses can be eliminated in vehicle assembly steps; spaces occupied by the wire harnesses can be reduced; the wire harness manufacturing steps can be automated; fixtures for fixing the wire harnesses can be eliminated; etc.

What is claimed is:

1. A wire harness arrangement for an automotive vehicle including electric devices and a vehicle body, which comprises:
    (a) at least one vehicle frame made of an insulating material for consisting the vehicle body; and
    (b) a wire harness buried in said vehicle frame after said vehicle frame has been molded, in such a way that at least one terminal of said wire harness connectable with at least one device connector is provided at an edge of an access window formed in the surface of said vehicle frame, to connect electric devices mounted on said vehicle frame.

2. The wire harness arrangement as set forth in claim 1, wherein said vehicle frame is the vehicle body itself.

3. The wire harness arrangement as set forth in claim 1, wherein said vehicle frame is a door frame integral with a trim cover.

4. The wire harness arrangement as set forth in claim 1, wherein said wire harness comprises conductors of single wires.

5. The wire harness arrangement as set forth in claim 1, wherein said wire harness comprises conductors of stranded wires.

6. The wire harness arrangement as set forth in claim 1, wherein said wire harness comprises conductors of ribbon or foil strips.

7. A wire harness arrangement for an automotive vehicle including electric devices and a vehicle body, which comprises:
    (a) at least one vehicle frame made of an insulating material for constituting the vehicle body; and
    (b) a wire harness molded integral with said at least one vehicle frame when said vehicle frame is molded, in such a way that at least one terminal of said wire harness connectable with at least one device connector is provided at an edge of an access window formed in the surface of said vehicle frame, to connect electric devices mounted on said vehicle frame.

* * * * *